US011363508B2

United States Patent
Nakajima et al.

(10) Patent No.: US 11,363,508 B2
(45) Date of Patent: Jun. 14, 2022

(54) UNMANNED AERIAL VEHICLE, CONTROLLER, AND MANAGEMENT DEVICE

(71) Applicant: HONDA MOTOR CO., LTD., Tokyo (JP)

(72) Inventors: Kei Nakajima, Tokyo (JP); Hirotaka Uchitomi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 119 days.

(21) Appl. No.: 17/032,145

(22) Filed: Sep. 25, 2020

(65) Prior Publication Data

US 2021/0099931 A1 Apr. 1, 2021

(30) Foreign Application Priority Data

Sep. 30, 2019 (JP) .............................. JP2019-179140

(51) Int. Cl.
| | | |
|---|---|---|
| *H04W 36/00* | (2009.01) | |
| *H04B 7/185* | (2006.01) | |
| *H04W 36/32* | (2009.01) | |
| *H04W 4/40* | (2018.01) | |
| *H04W 88/06* | (2009.01) | |

(52) U.S. Cl.
CPC ........ *H04W 36/03* (2018.08); *H04B 7/18506* (2013.01); *H04W 4/40* (2018.02); *H04W 36/32* (2013.01); *H04W 88/06* (2013.01)

(58) Field of Classification Search
CPC ....... H04W 36/03; H04W 4/40; H04W 36/32; H04W 88/06; H04W 4/023; H04W 36/0022; H04W 36/16; H04B 7/18506
See application file for complete search history.

(56) References Cited

U.S. PATENT DOCUMENTS

| | | | | |
|---|---|---|---|---|
| 9,988,140 | B2 * | 6/2018 | Priest | B64C 39/022 |
| 2015/0254988 | A1 * | 9/2015 | Wang | B64C 39/024 |
| | | | | 701/3 |
| 2016/0362180 | A1 * | 12/2016 | Priest | B64C 39/022 |
| 2022/0068143 | A1 * | 3/2022 | Xu | G08G 5/0069 |

FOREIGN PATENT DOCUMENTS

WO 2019/064636 A1 4/2019

* cited by examiner

*Primary Examiner* — Amancio Gonzalez
(74) *Attorney, Agent, or Firm* — Rankin, Hill & Clark LLP

(57) ABSTRACT

An unmanned aerial vehicle uses a calculation unit to calculate a distance between the unmanned aerial vehicle and a controller, uses a search unit to search for an available moving body communication line when the distance exceeds a predetermined threshold in a case where the unmanned aerial vehicle and the controller are directly communicating with each other, and uses a communication continuation processing unit to perform predetermined processing for continuing the communication depending on a search result. The unmanned aerial vehicle, the controller, and the management device may be linked to a block-chain network by communication via the block-chain network in association with processing.

11 Claims, 4 Drawing Sheets

UNMANNED AERIAL VEHICLE, CONTROLLER, AND MANAGEMENT DEVICE

INCORPORATION BY REFERENCE

The present application claims priority under 35 U.S.C. § 119 to Japanese Patent Application No. 2019-179140 filed on Sep. 30, 2019. The content of the application is incorporated herein by reference in its entirety.

BACKGROUND OF THE INVENTION

Field of the Invention

The present invention relates to an unmanned aerial vehicle, a controller, and a management device.

Description of the Related Art

A method for operating a drone by near field communication (e.g., with a communication band of 2.4 GHz) between a transmitter and a receiver which is installed in the main body of the drone, and a method for operating a drone by wireless communication using a mobile communication line are known (e.g., see International Publication No. 2019/064636).

SUMMARY OF THE INVENTION

However, the communication distance is limited in the near field communication, while the communication cost is likely to increase in the wireless communication using a mobile communication line.

Accordingly, an object of an aspect of the present invention is to easily achieve an increase in a communication range of an unmanned aerial vehicle and a reduction in communication cost.

To achieve the above-described object, an unmanned aerial vehicle including a function for wirelessly communicating with a controller includes: a calculation unit configured to calculate a distance between the unmanned aerial vehicle and the controller; a search unit configured to search for an available wireless communication line when the distance exceeds a threshold within a range in which the unmanned aerial vehicle and the controller directly communicatable with each other in a case where the unmanned aerial vehicle and the controller are directly communicating with each other; and a communication continuation processing unit configured to perform predetermined processing to continue communication depending on a result of the search.

In the above-described configuration, in a case where the available wireless communication line is specified, the communication continuation processing unit may request the controller to select whether to switch the communication to communication using the specified wireless communication line.

Further, in the above-described configuration, in a case where switching to the communication using the wireless communication line is selected by the selection request, the communication continuation processing unit may connect to the wireless communication line by communication and may establish a wireless communication with the controller via the wireless communication line.

Further, in the above-described configuration, the wireless communication line may be a communication line for an indirect communication using a relay device. Further, in the above-described configuration, in a case where the wireless communication line used for connection by communication includes a plurality of base stations, the communication continuation processing unit may perform processing corresponding to a handover for switching the base stations depending on a reception intensity between the communication continuation processing unit and the base stations.

Further, a controller including a function for wirelessly communicating with an unmanned aerial vehicle includes a communication control unit configured to connect the controller to the wireless communication line by communication in a case where the unmanned aerial vehicle switches the communication to communication using the wireless communication line, and to transmit a signal for controlling the unmanned aerial vehicle to the unmanned aerial vehicle by using the wireless communication line.

Further, a controller including a function for wirelessly communicating with an unmanned aerial vehicle includes: a communication control unit configured to perform processing for acquiring, via the wireless communication line, data on another unmanned aerial vehicle configured to perform wireless communication within a predetermined range based on the unmanned aerial vehicle after a connection to the wireless communication line is established by communication in a case where the unmanned aerial vehicle switches the communication to communication using the wireless communication line; and an information output unit configured to output information about the other unmanned aerial vehicle based on the data.

Further, a management device to be connected to the wireless communication line to which the unmanned aerial vehicle and the controller are connected by communication include: an information acquisition unit configured to acquire data on the other unmanned aerial vehicle located within a predetermined range based on the unmanned aerial vehicle connected by communication; and an information output processing unit configured to output information about the data to the controller.

Further, in the above-described configuration, some or all of processes of the unmanned aerial vehicle, the controller, and the management device may include communication via a block-chain network.

According to an aspect of the present invention, it is possible to easily achieve an increase in a communication range of an unmanned aerial vehicle and a reduction in communication cost.

DETAILED DESCRIPTION OF THE PREFERRED EMBODIMENTS

Embodiments of the present invention will be described below with reference to the drawings.

Figure 1:
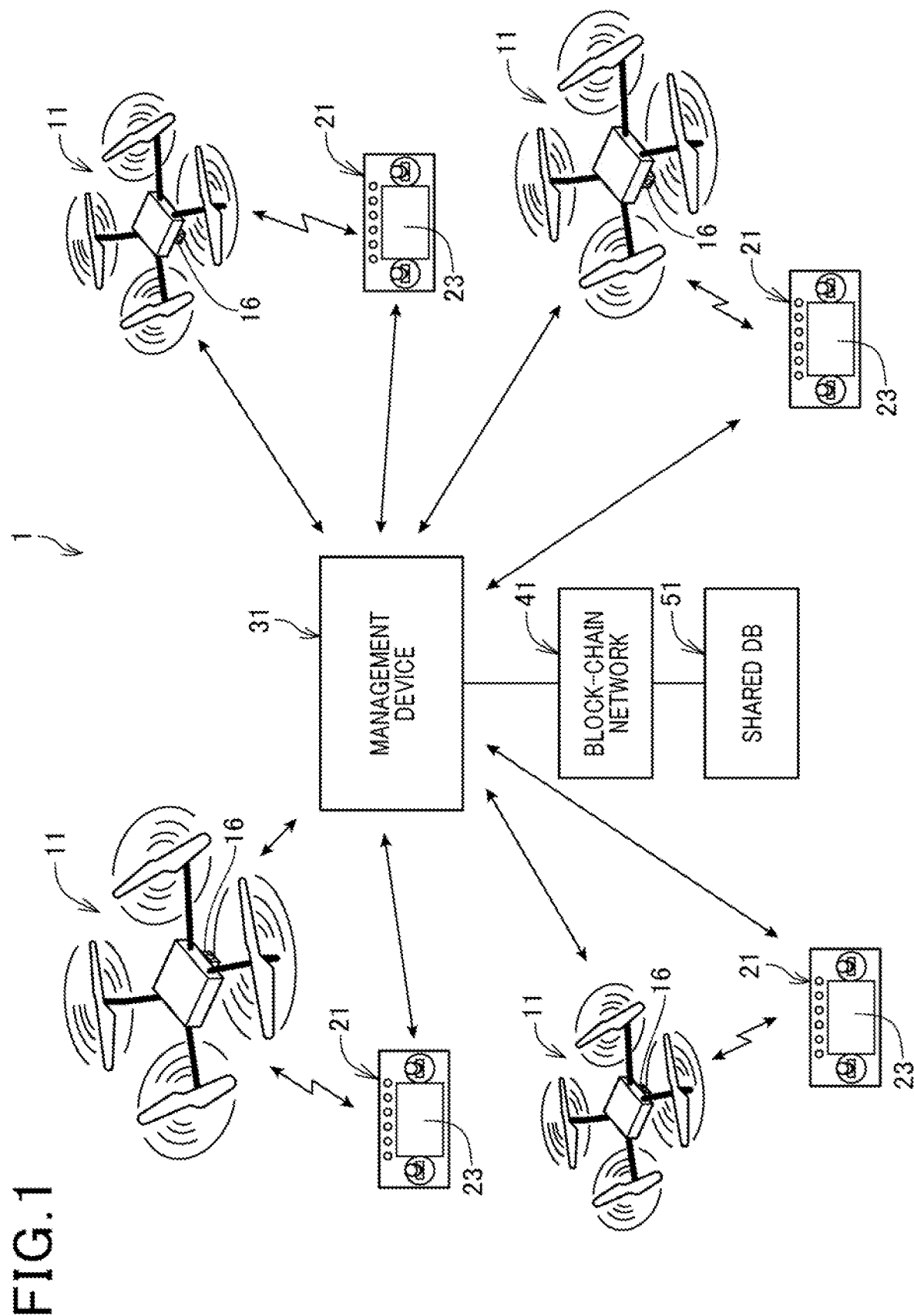
FIG. 1 is a view illustrating an aerial vehicle management system that manages an unmanned aerial vehicle according to an embodiment of the present invention.

FIG. 1 is a view illustrating an aerial vehicle management system that manages an unmanned aerial vehicle according to an embodiment of the present invention. An aerial vehicle management system 1 includes a plurality of unmanned aerial vehicles 11, a plurality of controllers 21 for operating each unmanned aerial vehicle 10, a management device 31 that performs processing on the unmanned aerial vehicles 11, a block-chain network 41, and a shared database ("database" is hereinafter abbreviated as "DB"). Each unmanned aerial vehicle 11 is called a drone and is capable of flying in the air. Each unmanned aerial vehicle 11 is used for various purposes, such as capturing an image of a surrounding landscape, delivery of goods, mails, and the like, or disaster relief.

The aerial vehicle management system 1 is used in a state where a plurality of unmanned aerial vehicles 11 is flying around in the air. Accordingly, there is a possibility that an image of the flying unmanned aerial vehicle 11 may be captured by another unmanned aerial vehicle 11.

Figure 2:
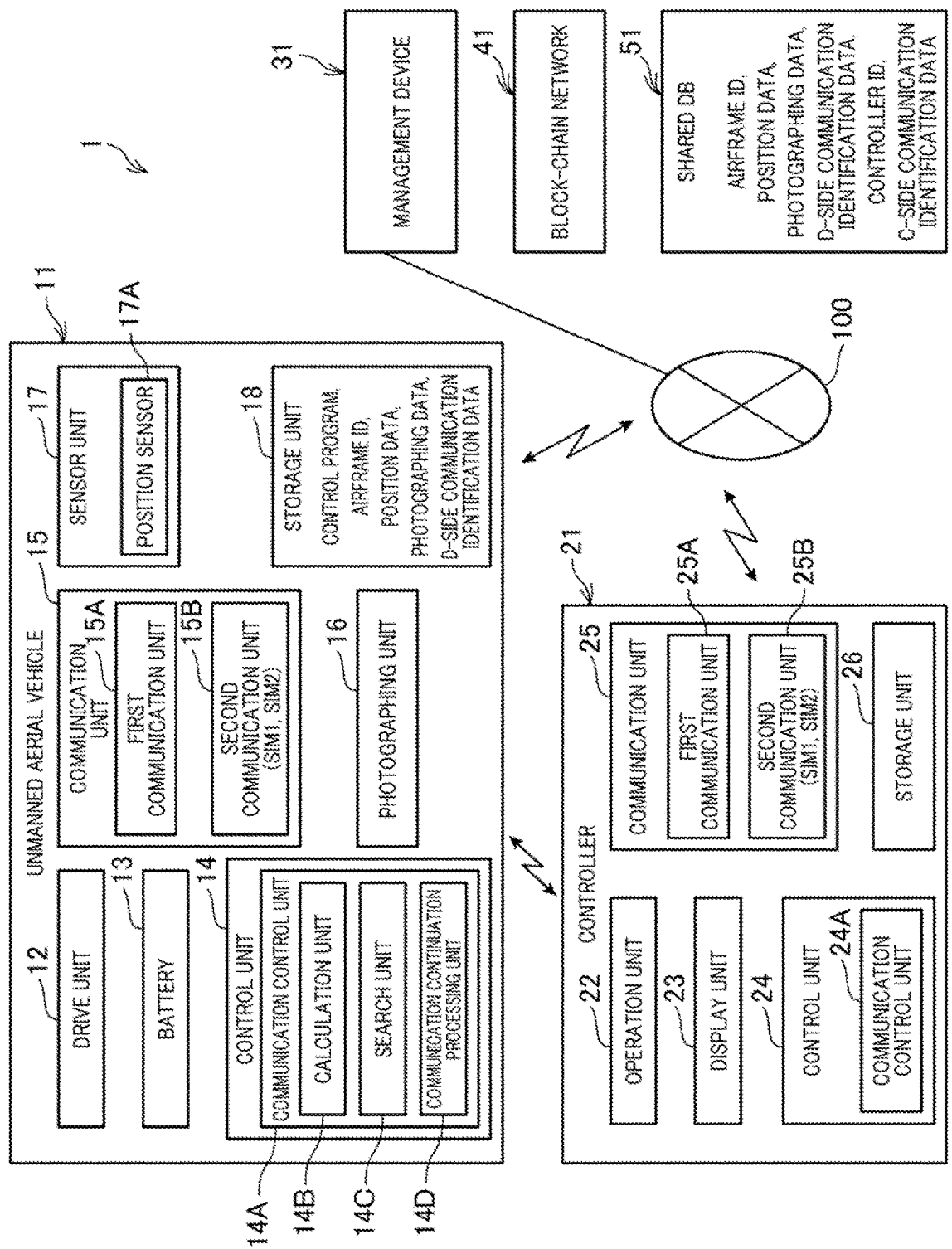
FIG. 2 is a block diagram illustrating configurations of the unmanned aerial vehicle and a controller and peripheral components.

FIG. 2 is a block diagram illustrating configurations of each unmanned aerial vehicle 11 and each controller 21 and peripheral components. The unmanned aerial vehicle 11 includes a drive unit 12, a battery 13, a control unit 14, a communication unit 15, a photographing unit 16, a sensor unit 17, a storage unit (memory), and a communication control unit 14A. The drive unit 12 is a drive motor that rotationally drives a plurality of propellers provided on the unmanned aerial vehicle 11, and is driven by power from the battery 13 under the control of the control unit 14. Instead of the drive motor, a power source, such as a gasoline engine, may be applied. A generator may be provided instead of the battery 13 or in addition to the battery 13.

The control unit 14 includes at least one microprocessor and controls each unit according to control programs stored in the storage unit 18. The control unit 14 functions as the communication control unit 14A that performs control for communication by executing a control program. The communication control unit 14A will be described below.

The communication unit 15 includes a first communication unit 15A for directly communicating with the controller 21, and a second communication unit 15B for indirectly communicating with the controller 21. The term "direct communication" refers to communication without involving a relay device, such as a computer or network (including a base station and a relay station). The term "indirect communication" refers to communication via a relay device such as a computer or network (including a base station and a relay station). In the present embodiment, the indirect communication is communication using a moving body communication line 100.

As the first communication unit 15A, any one of a communication module for near field communication, a communication module for intermediate-distance wireless communication, and a communication module for long-distance wireless communication is applied. For example, as the first communication unit 15A, a communication module that enables direct communication with the controller 21 or the like by using a system for general-purpose device, such as a wireless LAN or Bluetooth®, or a system for a specific device (e.g. radio control) such as FASST or FHSS.

As the second communication unit 15B, a communication module for known moving body communication is applied. Since a connection to the moving body communication line 100 (FIG. 2) including a large number of base stations can be established by communication using the second communication unit 15B, the communication range can be increased as compared with communication using the first communication unit 15A, and the moving body communication line 100 can also be connected to the Internet. The management device 31 is connected to the Internet and can communicate with each unmanned aerial vehicle 11 and the controller 21 via the Internet and the moving body communication line 100.

A SIM (Subscriber Identity Module) that stores information for authentication is required for the unmanned aerial vehicle 11 to connect to the moving body communication line 100 by communication. In the present embodiment, the second communication unit 15B is provided with at least one SIM (SIM1 and SIM2 as illustrated in FIG. 2) and is connectable to the moving body communication line 100 corresponding to each SIM by communication.

Specifically, the second communication unit 15B accesses information stored in each SIM, thereby making it possible to specify the available moving body communication line 100 and to connect to the specified moving body communication line 100 by communication using the information stored in each SIM.

In general, the administrator who manages each moving body communication line 100 recognizes information about a client (corresponding to an administrator of the unmanned aerial vehicle 11, for example, an operator), and thus can easily specify an administrator (e.g., an operator) of the unmanned aerial vehicle 11 based on authentication information within each SIM.

The photographing unit 16 (corresponding to a camera) includes an image capturing sensor and acquires photographing data by capturing an image of the landscape around the unmanned aerial vehicle 11. The sensor unit 17 includes a position sensor 17A that detects the position of each unmanned aerial vehicle 11. The position sensor 17A is a sensor capable of detecting the three-dimensional position of each unmanned aerial vehicle 11. A wide variety of known sensors, such as a GPS sensor, a direction sensor, and a gyroscope sensor, can be applied.

The storage unit 18 stores control programs to be executed by the control unit 14 and various types of data. Examples of various types of data include an airframe ID that functions as identification information for identifying each unmanned aerial vehicle 11, photographing data acquired by the photographing unit 16, position data detected by the position sensor 17A, and communication identification data based on which communication on the unmanned aerial vehicle 11 can be identified (hereinafter referred to as "drone (D)-side communication identification data").

The D-side communication identification data is information based on which the wireless communication line currently used by the communication unit 15 can be identified. Accordingly, by referring to the D-side communication identification data, for example, it can be specified whether the moving body communication line 100 corresponding to one of SIM1 and SIM2 is currently used by the second communication unit 15B.

In the data stored in the storage unit 18, at least position data and D-side communication identification data are continuously uploaded into the management device 31 in such a manner that the position data and the D-side communication identification data are linked to the airframe ID. Thus, the management device 31 can specify whether the unmanned aerial vehicle 11 is directly communicating with the controller 21 or communicating with the unmanned aerial vehicle 11 using the moving body communication line 100. Uploading of the data may be actively performed by, for example, the communication control unit 14A of the unmanned aerial vehicle 11, or may be passively performed by the communication control unit 14A or the like in response to a request from the management device 31.

The controller 21 is a device including a function for transmitting various instructions to the unmanned aerial vehicle 11. However, the controller 21 is not limited to a device exclusively used for operation, but instead may be a general-purpose device, such as a tablet terminal or a personal computer. As illustrated in FIG. 2, the controller 21 includes an operation unit 22, a display unit 23 (display), a control unit 24, a communication unit 25, and a storage unit 26 (memory). The operation unit 22 includes an operation element that receives an operation performed by the operator. The operator is a person who operates the controller 21 to cause the unmanned aerial vehicle 11 to fly. The operator is also referred to as a user or the like. The operation element is a known operation element such as a stick, a switch, a lever, a touch panel, a keyboard, or a mouse.

The display unit 23 is a known display device such as a liquid crystal display device. Various types of information are displayed for the operator under the control of the control unit 24. For example, like in a known controller for a drone, photographing images corresponding to photographing data obtained during photographing by the unmanned aerial vehicle 11 can be displayed, and various types of notification information can be displayed. In addition to the display unit 23, an audio output device or the like capable of outputting various types of sound may be provided.

The control unit 24 includes at least one microprocessor, and controls each unit according to control programs stored in the storage unit 26. Like the communication unit 15 of the unmanned aerial vehicle 11, the communication unit 25 includes a first communication unit 25A for directly communicating with the unmanned aerial vehicle 11, and a second communication unit 25B for indirectly communicating with the unmanned aerial vehicle 11, and is capable of directly or indirectly communicating with the unmanned aerial vehicle 11. The second communication unit 15B is also provided with at least one SIM (SIM1 and SIM2 as illustrated in FIG. 2), and can connect to the moving body communication line 100 corresponding to each SIM by communication.

The control unit 24 executes a control program to thereby also function as a communication control unit 24A that controls communication. The communication control unit 24A transmits a signal corresponding to an instruction for the operator from the controller 21 to the unmanned aerial vehicle 11 by direct or indirect communication, and thus can control, for example, the flight of each unmanned aerial vehicle 11.

The controller 21 can connect to the moving body communication line 100 by communication using the second communication unit 25B, and can communicate with the management device 31 via the Internet.

Upon receiving information to be sent to the operator from the management device 31, the communication control unit 24A also performs processing for causing the display unit 23 to display display information corresponding to the information. In the present embodiment, information (e.g., airframe ID) about another unmanned aerial vehicle 11 located within a predetermined range based on the unmanned aerial vehicle 11 can be acquired from the management device 31, and information can be displayed on the display unit 23. The predetermined range can be arbitrarily set.

Further, the processing of displaying information on the display unit 23 is not particularly limited, and information may be provided by sound. In other words, the display unit 23 or the like functions as an information output unit that outputs various types of information to the operator.

The storage unit 26 stores control programs to be executed by the control unit 24 and various types of data. Examples of various types of data include information required for communication with the unmanned aerial vehicle 11 and the management device 31, information transmitted from the management device 31, a controller ID for identifying the controller 21, and communication identification data based on which the state of communication on the controller 21 can be identified (hereinafter referred to as "controller (C)-side communication identification data").

The C-side communication identification data is information based on which the wireless communication line currently used by the communication unit 25 can be identified. Accordingly, by referring to the C-side communication identification data, for example, it can be specified whether the moving body communication line 100 corresponding to one of SIM1 and SIM2 is currently used by the second communication unit 25B. Also the C-side communication identification data is continuously uploaded into the management device 31 in such a manner that the C-side communication identification data is linked to the airframe ID. Uploading of the data from the controller 21 into the management device 31 may be actively performed by, for example, the communication control unit 24A of the controller 21, or may be passively performed by the communication control unit 24A or the like in response to a request from the management device 31. Photographing data from each unmanned aerial vehicle 11 may be stored in the storage unit 18, or may be displayed on the display unit 23.

The management device 31, the block-chain network 41, and a shared DB 51 are configured using one or more cloud computers, a network using a cloud computer, and a cloud database, respectively. However, this configuration is not limited to a cloud computer or the like.

Figure 3:
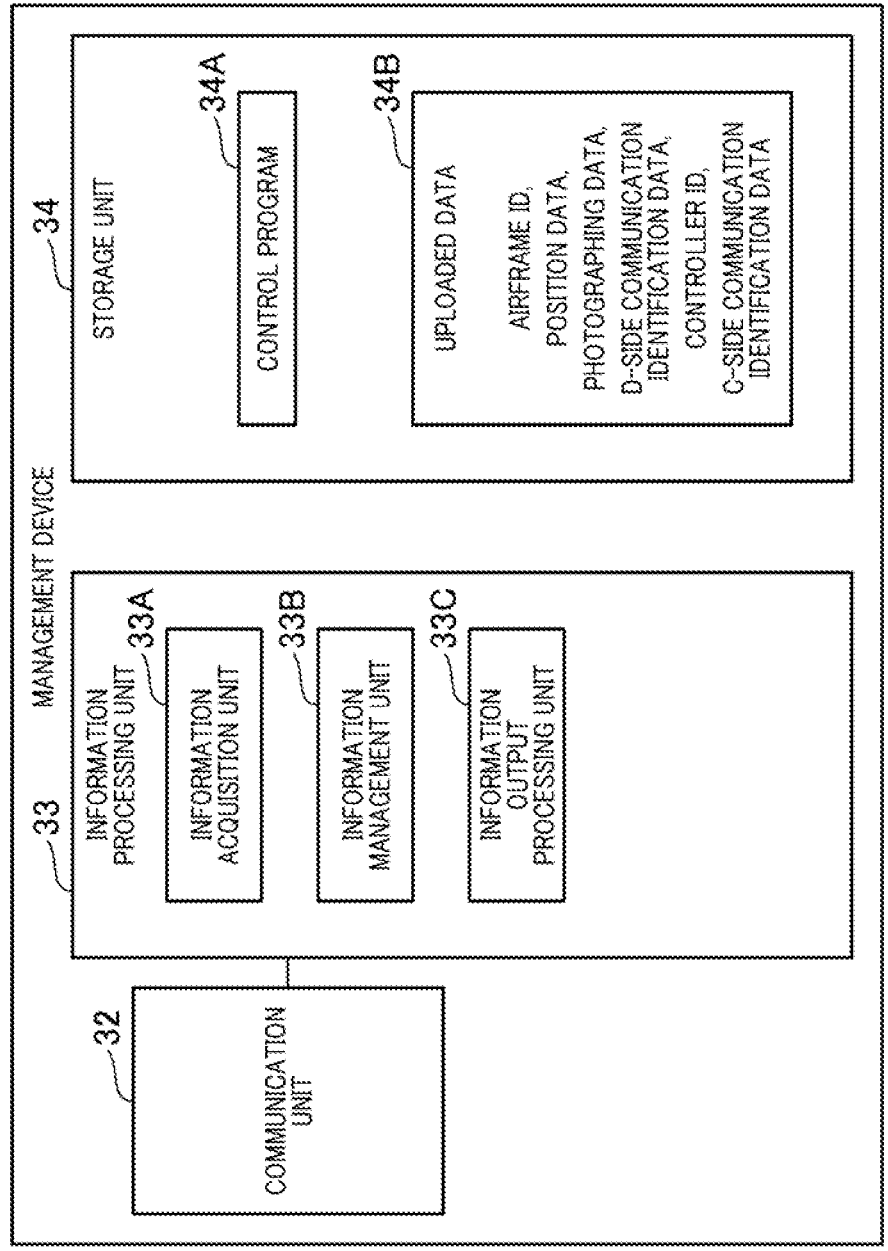
FIG. 3 is a block diagram illustrating a configuration of a management device.

FIG. 3 is a block diagram illustrating the configuration of the management device 31.

The management device 31 includes a communication unit 32, an information processing unit 33, and a storage unit 34 (memory). The communication unit 32 is a communication module for communicating with the unmanned aerial vehicle 11 and the controller 21, which are connected to the moving body communication line 100 by communication via the Internet, and for communicating data with the shared DB 51 via the block-chain network 41.

The information processing unit 33 includes a processor, and executes a control program 34A stored in the storage unit 34, thereby functioning as an information acquisition unit 33A, an information management unit 33B, an information output processing unit 33C, and the like. The information acquisition unit 33A, the information management unit 33B, the information output processing unit 33C, and the like may be configured using dedicated hardware.

The information acquisition unit 33A acquires various types of information transmitted from the unmanned aerial vehicle 11, the controller 21, and the like via the communication unit 32. For example, the information acquisition unit 33A can acquire various types of data (such as an airframe ID, position data, photographing data, D-side communication identification data, controller ID, and C-side communication identification data) stored in the storage units 18 and 26 of the unmanned aerial vehicle 11 and the controller 21, respectively.

For example, the information management unit 33B manages information that is input to and output from the management device 31, manages information stored in the storage unit 34, and manages information (information to be provided) transmitted from the management device 31.

The information output processing unit 33C accesses the shared DB 51 via the communication unit 32 to monitor information about the unmanned aerial vehicle 11 and the controller 21. Further, in the information output processing unit 33C, the information acquisition unit 33A uses the position data on each unmanned aerial vehicle 11, and acquires the data (e.g., airframe ID) about another unmanned aerial vehicle 11 located within a predetermined range based on the unmanned aerial vehicle 11 connected to the moving body communication line 100 by communication from the management device that manages the moving body communication line 100. Thus, data on the unmanned aerial vehicle 11 flying around the unmanned aerial vehicle 11 with which the controller 21 is communicating among a large number of unmanned aerial vehicles 11 connected to the moving body communication line 100 by communication can be acquired.

Further, the information output processing unit 33C transmits the acquired data to the controller 21, thereby performing processing for notifying (corresponding to information output) the operator of the communication corresponding to the data using the display unit 23 or the like of the controller 21. Thus, a notification about the unmanned aerial vehicle 11 flying around the unmanned aerial vehicle 11 controlled by the operator can be sent to the operator.

The storage unit 34 stores not only the control program 34A, but also various types of data, which are acquired via the information acquisition unit 33A, as uploaded data 34B. The uploaded data 34B is uploaded into the shared DB 51 via the block-chain network 41. Thus, information about the plurality of unmanned aerial vehicles 11 and information about the plurality of controllers 21 are accumulated in the shared DB 51. For example, an access to the shared DB 51 makes it possible to specify the flight position for each airframe ID and to specify, for example, the wireless communication lines to be used by each unmanned aerial vehicle 11 and each controller 21.

In this case, the block-chain network 41 is a network that implements a technique for storing a request including a content of a transaction occurring in the network into a block, further storing information, such as a hash value indicating a content of a block previously generated in each block, and coupling the blocks to manage data. The blocks in which all nodes constituting the block-chain network 41 are coupled are held, thereby making it difficult to manipulate the above-described various types of data. Further, the various types of data may be encrypted and encrypted data may be stored in the shared DB 51. Encrypting the data makes it possible to easily ensure the security of the data.

The communication control unit 14A of the unmanned aerial vehicle 11 will be described.

The communication control unit 14A includes a calculation unit 14B, a search unit 14C, and a communication continuation processing unit 14D. The calculation unit 14B performs processing for calculating a distance between the unmanned aerial vehicle 11 and the controller 21 that controls the unmanned aerial vehicle 11. In this processing, known methods, such as, a method using a known distance sensor, a method for calculating a distance from each position by specifying the positions of the unmanned aerial vehicle 11 and the controller 21 using a known position sensor, and a method for predicting a distance based on a reception electric field intensity with the controller 21, may be applied.

The search unit 14C performs processing for searching for the wireless communication line (moving body communication line 100 corresponding to each of SIM1 and SIM2) that can be used by the communication unit 15. Specifically, the search unit 14C accesses each SIM stored in the unmanned aerial vehicle 11, specifies the moving body communication line 100 based on accessed information, and performs processing for searching for the specified moving body communication line 100.

The communication continuation processing unit 14D performs predetermined processing to continue the communication of the unmanned aerial vehicle 11. Specifically, the communication continuation processing unit 14D performs, for example, processing for switching to the moving body communication line 100 searched for by the search unit 14C, and processing for stopping the flight to prevent the unmanned aerial vehicle 11 from moving to the outside of the communication range for a direct communication.

Incidentally, in a case where the communication between the unmanned aerial vehicle 11 and the controller 21 is direct communication using the first communication unit 15A, the communication distance is limited. On the other hand, in the communication using the second communication unit 15B, the communication cost is liable to increase.

Accordingly, in the present embodiment, in a case where the unmanned aerial vehicle 11 is directly communicating with the controller 21, before moving to the outside of the communicable distance, communication control for switching the communication to communication using the second communication unit 15B is performed.

Figure 4:
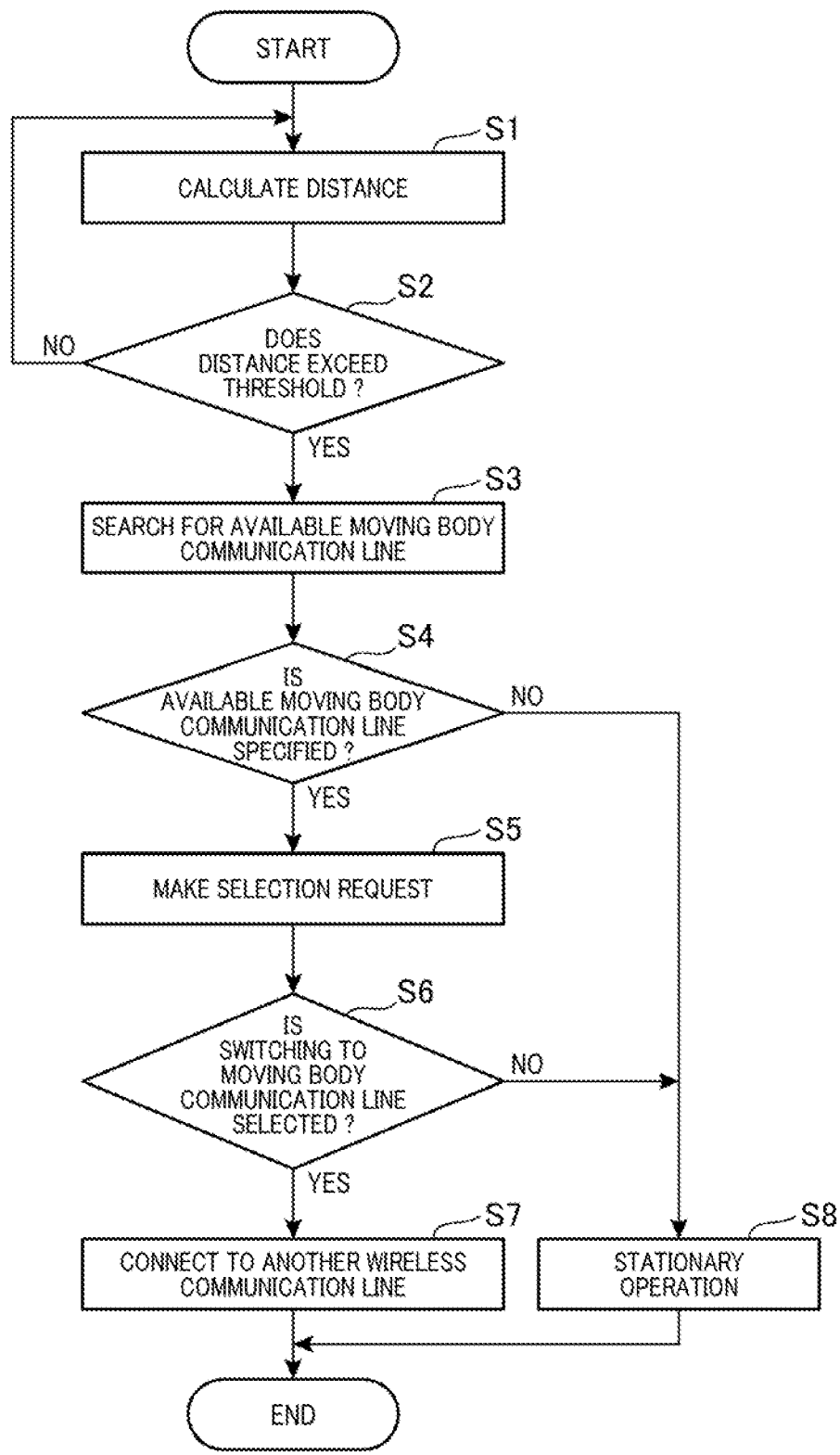
FIG. 4 is a flowchart illustrating an example of a communication control for the unmanned aerial vehicle.

FIG. 4 is a flowchart illustrating an example of communication control for the unmanned aerial vehicle 11. It is assumed that this flowchart is processing to be executed when the unmanned aerial vehicle 11 is directly communicating with the controller 21 by using the first communication unit 15A.

The communication control unit 14A of the unmanned aerial vehicle 11 uses the calculation unit 14B to calculate the distance to the controller 21 that controls the unmanned aerial vehicle 11 (step S1), and determines whether the calculated distance exceeds a predetermined threshold (step S2). The threshold is a value that defines an upper limit of a communication distance for a direct communication and can be arbitrarily set.

When the distance is less than the threshold (step S2; NO), the communication control unit 14A uses the first communication unit 15A to continue the communication with the controller 21.

On the other hand, when the distance exceeds the threshold (step S2; YES), the communication control unit 14A uses the search unit 14C to search for the moving body communication line 100 that can be used by the communication unit 15 (step S3). In this case, the search unit 14C searches for the moving body communication line 100 corresponding to each SIM stored in the unmanned aerial vehicle 11 by the second communication unit 15B.

If the available moving body communication line 100 is specified (step S4; YES), the communication control unit 14A requests the controller 21 to select whether to switch to the specified moving body communication line 100 (step S5). Specifically, the communication control unit 14A uses the communication unit 15 (corresponding to the first communication unit 15A) to transmit information corresponding to the selection request to the controller 21.

In the controller 21 to which the selection request has been sent, the control unit 24 displays predetermined information on the display unit 23 to prompt the operator to select whether to switch to the specified moving body communication line 100. Further, when the operator performs the operation corresponding to the selection request, the control unit 24 (corresponding to the communication control unit 24A) transmits information corresponding to the operation to the unmanned aerial vehicle 11 by the first communication unit 15A. Thus, a notification about the result selected by the operator is sent to the unmanned aerial vehicle 11.

If the moving body communication lines 100 respectively corresponding to the SIMs stored in the unmanned aerial vehicle 11 are available, the operator may select any one of the moving body communication lines 100, or may select any one of the moving body communication lines 100 according to a predetermined priority order.

If the communication control unit 14A of the unmanned aerial vehicle 11 selects switching to the moving body communication line 100 (step S6; YES), the second communication unit 15B connects to the specified moving body communication line 100 by communication and starts communication with the controller 21 by using the moving body communication line 100 used for connection by communication (step S7). Thus, even when the unmanned aerial vehicle 11 has moved to the outside of the area in which the direct communication can be established with the controller 21, the communication between the unmanned aerial vehicle 11 and the controller 21 can be continued.

To continue the communication between the unmanned aerial vehicle 11 and the controller 21 by using the moving body communication line 100, the controller 21 also needs to connect to the moving body communication line 100 by communication. In the present embodiment, for example, the communication control unit 14A of the unmanned aerial vehicle 11 transmits a signal indicating switching to the moving body communication line 100 to the controller 21 and the controller 21 which has received the signal performs processing for switching the moving body communication line 10 to another moving body communication line 100 under the control of the communication control unit 24A. However, the processing to be performed is not limited to this processing. For example, when the operator performs the operation corresponding to the selection request, the communication control unit 24A of the controller 21 may perform processing for forcibly switching the moving body communication line 100 to another moving body communication line 100.

Both the unmanned aerial vehicle 11 and the controller 21 may be connected to another moving body communication line 100, and, for example, a technique in which mobile terminals communicate data via a known moving body communication line 100 may be applied as a mutual communication method.

In a case where the communication between the unmanned aerial vehicle 11 and the controller 21 is established using the moving body communication line 100, the communication control units 14A and 24A of the unmanned aerial vehicle 11 and the controller 21, respectively, perform processing corresponding to a known handover for switching base stations depending on the reception intensity for each base station accommodated in the moving body communication line 100. With this configuration, even when the unmanned aerial vehicle 11 and the controller 21 move, the communication using the moving body communication line 100 can be continued.

On the other hand, in step S4, if the moving body communication line 100 corresponding to another wireless communication line cannot be specified (step S4; NO), or in step S6, if switching to the specified moving body communication line 100 is not selected (step S6; NO), the communication control unit 14A proceeds to processing in step S8.

Processing in step S8 is processing for continuing the communication between the unmanned aerial vehicle 11 and the controller 21 without switching to the moving body communication line 100. Specifically, the communication control unit 14A performs a stationary operation to cause the unmanned aerial vehicle 11 to be held at the current position. The control operation is not limited to the stationary operation, and a wide variety of control operations for holding the unmanned aerial vehicle 11 at a position where the unmanned aerial vehicle 11 can communicate with the controller 21 can be applied. For example, a control operation for causing the unmanned aerial vehicle 11 to fly to a position closer to the controller 21 may be performed. The operation in the flowchart illustrated in FIG. 4 has been described above.

As described above, in the present embodiment, both the unmanned aerial vehicle 11 and the controller 21 store information about the unmanned aerial vehicle 11 and the controller 21 into the storage unit 34 as the uploaded data 34B, and the information is uploaded into the shared DB 51 via the block-chain network 41. Accordingly, an access to the shared DB 51 makes it possible to easily specify whether the communication between the unmanned aerial vehicle 11 and the controller 21 is direct communication or indirect communication.

The information output processing unit 33C of the management device 31 accesses the shared DB 51 to thereby monitor whether the communication between the unmanned aerial vehicle 11 and the controller 21 has been switched to communication using the moving body communication line 100. Upon detecting the switching, the information output processing unit 33C uses the information acquisition unit 33A to acquire, from the management device that manages the moving body communication line 100 of the switching destination, data on other unmanned aerial vehicles 11 flying around the unmanned aerial vehicle 11.

Next, the information output processing unit 33C transmits the acquired data to the controller 21 to output information corresponding to the data to the controller 21, thereby making it possible to inform the operator of the unmanned aerial vehicle 11 flying around the unmanned aerial vehicle 11 controlled by itself.

Specifically, in a case where the communication between the unmanned aerial vehicle 11 and the controller 21 is communication using the moving body communication line 100, the unmanned aerial vehicle 11 present in the communication area of the moving body communication line 100 can be recognized by communication connection by the unmanned aerial vehicle 11 or the like on the management side that manages the moving body communication line 100. Further, the use of the recognition result enables the operator of the unmanned aerial vehicle 11 to confirm the unmanned aerial vehicles 11 flying around the unmanned aerial vehicle 11 controlled by itself. This confirmation enables the operator to take measures, such as a measure for causing the unmanned aerial vehicles 11 to fly to avoid the unmanned aerial vehicles 11 flying around, for example, if an excess number of unmanned aerial vehicles 11 are located around the unmanned aerial vehicle 11.

While the present embodiment illustrates a case where data on other unmanned aerial vehicles 11 flowing around the peripheral area is acquired, the present invention is not limited to this case. Other data on other unmanned aerial vehicles 11 may be acquired.

As described above, in each of the unmanned aerial vehicles 11, the calculation unit 14B calculates a distance between the unmanned aerial vehicle 11 and the controller 21, and when direct communication is established between the unmanned aerial vehicle 11 and the controller 21 and the distance exceeds a predetermined threshold, the search unit 14C searches for the available moving body communication line 100. Further, in the unmanned aerial vehicle 11, the communication continuation processing unit 14D performs predetermined processing for continuing the communication depending on the search result. Thus, if communication using the available moving body communication line 100 is performed as the predetermined processing, the communication range in which the unmanned aerial vehicle 11 and the controller 21 can communicate with each other can be increased. Further, within the distance at which the unmanned aerial vehicle 11 and the controller 21 can directly communicate with each other, the direct communication can be continued and an increase in communication cost can be suppressed.

Further, when the communication continuation processing unit 14D specifies the moving body communication line 100, the communication continuation processing unit 14D requests the controller 21 to select whether to switch the communication to communication using the specified moving body communication line 100, so that the operator of the controller 21 can select whether to use the moving body communication line 100. Further, when switching to the communication using the moving body communication line 100 is selected by the selection request, the communication continuation processing unit 14D connects to the specified moving body communication line 100 by communication to wirelessly communicate with the controller 21 via the moving body communication line 100. Accordingly, the communication can be switched to the communication using the moving body communication line 100 according to the will of the operator of the controller 21. Consequently, it is possible to prevent a situation where the cost of communication using the moving body communication line 100 is increased against the will of the operator of the controller 21.

In this case, the moving body communication line 100, i.e., a wireless communication line using a relay station, such as a base station, is used, and thus the communication range can be increased using the existing communication infrastructure. In addition, the communication continuation processing unit 14D of the unmanned aerial vehicle 11 performs processing corresponding to a handover for switching base stations depending on the reception intensity between the communication continuation processing unit 14D and the base stations. Consequently, even when the unmanned aerial vehicles 11 fly at a high speed, the communication can be easily continued while communication interruption is prevented.

In a case where the unmanned aerial vehicle 11 switches the communication to communication using the moving body communication line 100, the controller 21 uses the communication control unit 24A to connect the controller 21 to the switching destination of the moving body communication line 100 by communication, and uses the moving body communication line 100 to transmit a signal for controlling the unmanned aerial vehicle 11 to the unmanned aerial vehicle 11. Thus, the communication between the unmanned aerial vehicle 11 and the controller 21 can be continued using the moving body communication line 100.

In a case where the unmanned aerial vehicle 11 switches the communication to communication using the moving body communication line 100, the controller 21 connects to the moving body communication line 100 by the communication control unit 24A and then performs processing for acquiring data on another unmanned aerial vehicle 11 that performs wireless communication within a predetermined range based on the unmanned aerial vehicle 11 via the moving body communication line 100 and outputs information about the other unmanned aerial vehicle 11 based on the data by the display unit 23 that functions as an information output unit. Consequently, the operator of the controller 21 can obtain information about other unmanned aerial vehicles 11 flying around.

Further, the management device 31 uses the information acquisition unit 33A to acquire information about the unmanned aerial vehicle 11 and the controller 21, and stores the information into the shared DB 51 via the block-chain network 41. This configuration makes it difficult to manipulate the information about the unmanned aerial vehicle 11 and the controller 21 and makes it possible to easily manage the history of the information.

Further, the management device 31 uses the information acquisition unit 33A to acquire data on other unmanned aerial vehicles 11 located within the predetermined range based on the unmanned aerial vehicle 11 to which the moving body communication line 100 is connected by communication, and causes the information output processing unit 33C to output information about the acquired data to the controller 21. This configuration makes it possible to inform the operator of the controller 21 of the unmanned aerial vehicles 11 flying around the unmanned aerial vehicle 11 controlled by the operator.

Further, the management device 31 performs communication via the block-chain network 41 in association with processing executed by each unit of the management device 31. Accordingly, advantageous effects of, for example, achieving the aerial vehicle management system 1 that is linked to the block-chain network 41, preventing manipulation of data, and managing the history can be obtained. The communication via the block-chain network 41 is not limited to the above-described mode. Some or all of processing of one of the unmanned aerial vehicle 11, the controller 21, the information acquisition unit 33A of the management device 31, the information management unit 33B of the management device 31, and the information output processing unit 33C of the management device 31 may include communication via the block-chain network 41.

The above-described embodiments are merely embodiments of the present invention and can be arbitrarily modified and applied without departing from the gist of the present invention. For example, while the above-described embodiments illustrate a case where the search unit 14C searches for the moving body communication line 100, a wireless communication line other than the moving body communication line 100 may be searched for. Further, each component in each of the unmanned aerial vehicle 11, the controller 21, and the management device 31 can be arbitrarily implemented by, for example, hardware and software in cooperation. Further, the process corresponding to each step in each flowchart may be divided or combined.

REFERENCE SIGNS LIST 1 aerial vehicle management system
11 unmanned aerial vehicle
14, 24 control unit
14A communication control unit
14B calculation unit
14C search unit 14D communication continuation processing unit
15, 25, 32 communication unit
15A, 25A first communication unit
15B, 25B second communication unit
21 controller
23 display unit (information output unit)
24A communication control unit
31 management device
33 information processing unit
33A information acquisition unit
33B information management unit
33C information output processing unit
34 storage unit
41 block-chain network
51 shared database
100 moving body communication line (wireless communication line)

What is claimed is:

1. An unmanned aerial vehicle including a function for wirelessly communicating with a controller, the unmanned aerial vehicle comprising:
a calculation unit configured to calculate a distance between the unmanned aerial vehicle and the controller;
a search unit configured to search for an available wireless communication line when the distance exceeds a threshold within a range in which the unmanned aerial vehicle and the controller directly communicatable with each other in a case where the unmanned aerial vehicle and the controller are directly communicating with each other; and
a communication continuation processing unit configured to perform predetermined processing to continue communication depending on a result of the search.

2. The unmanned aerial vehicle according to claim 1, wherein in a case where the available wireless communication line is specified, the communication continuation processing unit requests the controller to select whether to switch the communication to communication using the specified wireless communication line.

3. The unmanned aerial vehicle according to claim 2, wherein in a case where switching to the communication using the wireless communication line is selected by the selection request, the communication continuation processing unit connects to the wireless communication line by communication and establishes a wireless communication with the controller via the wireless communication line.

4. The unmanned aerial vehicle according to claim 1, wherein the wireless communication line is a communication line for an indirect communication using a relay device.

5. The unmanned aerial vehicle according to claim 3, wherein in a case where the wireless communication line used for the connection by communication includes a plurality of base stations, the communication continuation processing unit performs processing corresponding to a handover for switching the base stations depending on a reception intensity between the communication continuation processing unit and the base stations.

6. The unmanned aerial vehicle according to claim 1, wherein some or all of processes for at least one of the unmanned aerial vehicles include communication via a block-chain network.

7. A controller including e function for wirelessly communicating with an unmanned aerial vehicle according to claim 1, the controller comprising:
a communication control unit configured to connect the controller to the wireless communication line by communication in a case where the unmanned aerial vehicle switches the communication to communication using the wireless communication line, and to transmit a signal for controlling the unmanned aerial vehicle to the unmanned aerial vehicle by using the wireless communication line.

8. A controller including a function for wirelessly communicating with an unmanned aerial vehicle according to claim 1 the controller comprising:
a communication control unit configured to perform processing for acquiring, via the wireless communication line, data on another unmanned aerial vehicle configured to perform wireless communication within a predetermined range based on the unmanned aerial vehicle after a connection to the wireless communication line is established by communication in a case where the unmanned aerial vehicle switches the communication to communication using the wireless communication line; and
an information output unit configured to output information about the other unmanned aerial vehicle based on the data.

9. The controller according to claim 7, wherein some or all of processes of one of the controllers include communication via a block-chain network.

10. A management device to be connected to a wireless communication line to which an unmanned aerial vehicle and a controller are connected by communication,
wherein the unmanned aerial vehicle comprises:
a calculation unit configured to calculate a distance between the unmanned aerial vehicle and the controller;
a search unit configured to search for an available wireless communication line when the distance exceeds a threshold within a range, in which the unmanned aerial vehicle and the controller directly communicatable with each other in a case w here the unmanned aerial vehicle and the controller are directly communicating with each other; and
a communication continuation processing unit configured to perform predetermined processing to continue communication depending on a result of the search;
wherein the controller comprises:
a communication control unit configured to perform processing for acquiring, via the wireless communication line, data on another unmanned aerial vehicle configured to perform wireless communication within a predetermined range based on the unmanned aerial vehicle after a connection to the wireless communication line is established by communication in a case where the unmanned aerial vehicle switches the communication to communication using the wireless communication line: and
an information output unit configured to output information about the other unmanned aerial vehicle based on the data;
the management device comprising:
an information acquisition unit configured to acquire data on another unmanned aerial vehicle located within a predetermined range based on the unmanned aerial vehicle connected by communication; and
an information output processing unit configured to output information about the data to the controller.

11. The management device according to claim 10, wherein some or all of processes of one of the management devices include communication via a block-chain network.

\* \* \* \* \*